US005209623A

United States Patent [19]

Krehnovi

[11] Patent Number: 5,209,623

[45] Date of Patent: May 11, 1993

[54] WHEEL STUD INSTALLATION APPARATUS

[76] Inventor: Michael E. Krehnovi, 214 Summerfield Dr., Baden, Pa. 15005

[21] Appl. No.: 771,613

[22] Filed: Oct. 4, 1991

Related U.S. Application Data

[63] Continuation of Ser. No. 564,809, Aug. 8, 1990, abandoned.

[51] Int. Cl.[5] .......... F16B 37/08; B23P 19/04; B60B 1/00

[52] U.S. Cl. .......... 411/432; 411/533; 411/917; 29/263; 301/35.62

[58] Field of Search .......... 411/432, 533, 546, 916, 411/917; 29/263, 264; 301/36 R, 9 DN

[56] References Cited

U.S. PATENT DOCUMENTS

| | | | |
|---|---|---|---|
| 1,625,344 | 4/1927 | Vingheroets | 29/263 |
| 2,036,782 | 4/1936 | Ullmo | 29/263 |
| 2,464,133 | 3/1949 | Herbert | 411/432 |
| 2,633,176 | 3/1953 | Fears | 411/432 |
| 3,142,113 | 7/1964 | Cloud | 29/263 |
| 4,717,299 | 1/1988 | Underwood | 411/533 |

*Primary Examiner*—Neill R. Wilson

*Attorney, Agent, or Firm*—Porter, Wright, Morris & Arthur

[57] ABSTRACT

A stud installer is provided that will not transmit torque to the spindle while the stud is being installed. Additionally, the stud installer of the present invention will not transmit force in a direction perpendicular to the stud.

The present invention includes a collar having a longitudinal bore therethrough. The collar has a bearing surface at one end and support surface at the other. The collar can be of various geometries such as a straight cylinder or cylindrical with the support surface of larger diameter than the bearing surface.

A stud puller of unitary construction is also provided which includes an upper portion and a lower portion. The lower portion is constructed to be received by the bore in the collar. The upper portion has a diameter greater than that of the bore of the collar. In this manner, the upper portion rests on the collar and is free to rotate about the central longitudinal axis of the collar. If desired, a washer can be placed between the upper portion of the stud puller and the collar to allow the stud puller to rotate with a minimum of friction. The stud puller includes a threaded bore therethrough with threads corresponding to those of the stud to be installed. The bore extends completely through the stud puller so that the stud puller may accommodate studs of any length.

10 Claims, 2 Drawing Sheets

WHEEL STUD INSTALLATION APPARATUS

This is a continuation of U.S. patent application Ser. No. 07/564,809, filed Aug. 8, 1990, now abandoned.

BACKGROUND OF THE INVENTION

1. Field of the Invention

The present invention is directed to an apparatus for installing a wheel stud into the spindle of a motor vehicle. Specifically, an apparatus is provided which allows the installation of a wheel stud into the spindle of a motor vehicle without damaging the stud or the spindle.

2. Description of the Invention Background

Wheel studs are the bolts which are employed to attach a wheel and tire to an automobile. The studs project through the spindle, axle or rotor of an automobile. Typically, there are four or five studs for each wheel. The wheel has four or five corresponding holes to receive the studs. The studs have a knurled portion at one end with a diameter substantially equal to the hole in the spindle to allow for a frictional connection therebetween. Additionally, the stud has a shoulder which, when the stud is completely installed, abuts against the underside of the spindle. Lug nuts are used to hold the wheel on the studs. Wheel studs will often break due to corrosion, fatigue or excessive forces caused by poor road conditions.

It is common practice to replace broken or worn wheel studs in spindles with new ones. Stud installers in the prior art have been constructed as a single member with a threaded bore. With these stud installers in the prior art, the torque which is applied to the stud installer to pull the stud through the hole in the spindle is transmitted directly to the spindle by the stud installer resting therein. When this occurs, the stud installer cuts into and causes deformation of the spindle. Another problem with stud installers of the prior art is that they can transmit forces to the stud in a direction perpendicular to the stud which sometimes results in damage to the stud or spindle. The need exists for a stud installer which will not transmit torque to the spindle thereby damaging the spindle. Additionally, the need exists for a stud installer which will not transmit forces to the stud any direction other than parallel to the stud.

SUMMARY OF THE INVENTION

The present invention is directed to a stud installer that will prevent damage to the spindle by isolating the spindle with respect to the stud and therefore will not transmit torque to the spindle while the stud is being installed. Additionally, the stud installer of the present invention will not transmit force in a direction perpendicular to the stud.

The present invention includes a collar having a longitudinal bore therethrough. The collar has a bearing surface at one end and support surface at the other. The support surface is adapted for engagement with a spindle while the bearing surface engages a stud puller. The collar can be of various geometries such as a straight cylinder or cylindrical with the support surface of larger diameter than the bearing surface.

A stud puller of unitary construction is also provided which includes an upper portion and a lower portion. The lower portion is constructed to be received by the bore in the collar. The upper portion has a diameter greater than that of the bore of the collar. The upper portion has an abutment surface adapted for engagement with the bearing surface of the collar and rests on the bearing surface. Thus, the stud puller is free to rotate about the central longitudinal axis of the collar. If desired, a washer can be placed between the upper portion of the stud puller and the collar to allow the stud puller to rotate with a minimum of friction. The stud puller includes a threaded bore therethrough with threads corresponding to those of the stud to be installed. The bore extends completely through the stud puller so that the stud puller may accommodate studs of any length. Studs that are longer than the combined length of the stud puller and collar may project through the top of the upper portion.

DESCRIPTION OF THE DRAWINGS

In order that the present invention may be understood and readily practiced, a preferred embodiment will now be described, by way of example only, in conjunction with the following figures wherein.

DESCRIPTION OF A PREFERRED EMBODIMENT

Figure 1:
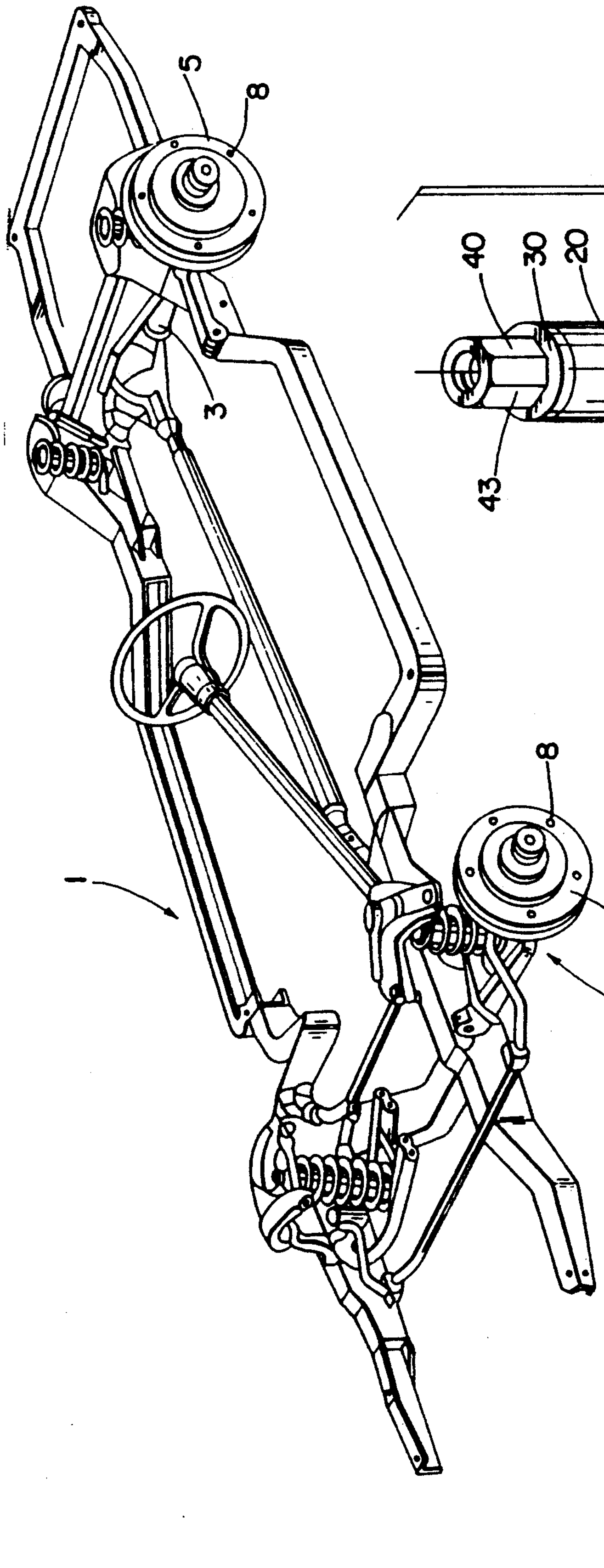
FIG. 1 is a simplified perspective view of an automobile chassis.
Figure 2:
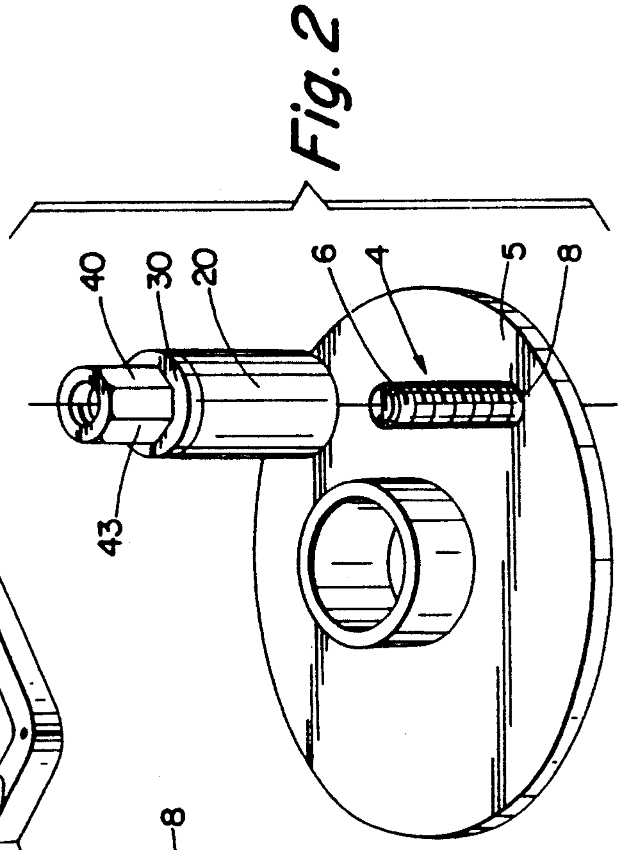
FIG. 2 is a perspective view of a stud installer constructed according to the teachings of the present invention, shown in conjunction with a stud and spindle.

The apparatus of the present invention is a stud installer 10 to be used for installing a stud 4 into a spindle 5 of a motor vehicle. The chassis 1 of a motor vehicle is shown in FIG. 1. As is known, the spindle 5 attaches to the suspension and steering mechanism 2 in the front end of the chassis 1 and to the axle 3 at the rear of the chassis 1. The spindle 5 attaches to the motor vehicle in the conventional manner and is provided with a plurality of holes similar to the hole 8 shown in FIG. 2. As is known, the studs project through the holes in the spindle 5 to be received by holes in the wheel of the vehicle. Lug nuts are used to hold the wheel in place, as is also known. The stud installer 10, as seen in FIG. 3, includes a collar 20, a washer 30 and a stud puller 40.

Figure 9:
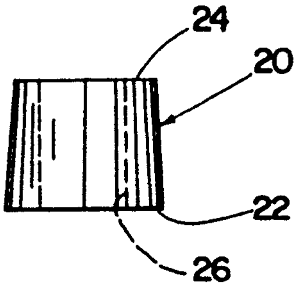
FIG. 9 is a front view of a collar of the present invention.
Figure 10:
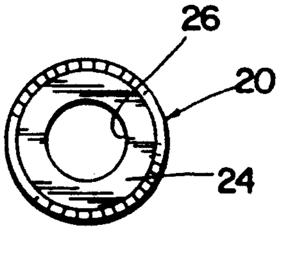
FIG. 10 is a top view of the collar of FIG. 9.

The collar 20 has a support surface 22, a bearing surface 24 and a bore 26. As will be appreciated by one skilled in the art, the collar can be of various geometries. For example, as seen in FIG. 9, the collar 20 can have a support surface 22 of larger diameter than the diameter of the bearing surface 24 to accommodate various sizes of studs. The support surface 22 is adapted to engage the spindle 14 but not to rotate relative thereto.

Figure 5:
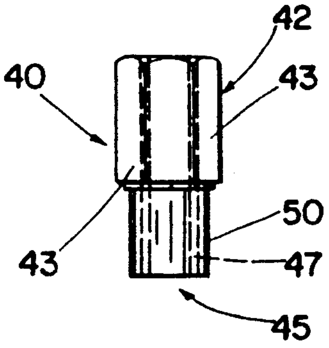
FIG. 5 is a front view of a stud puller constructed according to the teachings of the present invention.
Figure 6:
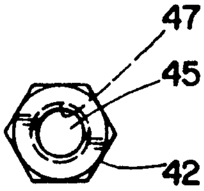
FIG. 6 is a top view of the stud puller illustrated in FIG. 5.
Figure 7:
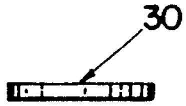
FIG. 7 is a front view of a washer of the present invention.
Figure 8:
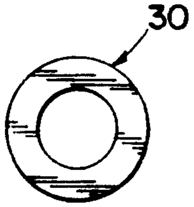
FIG. 8 is a top view of the washer illustrated in FIG. 7 of the present invention.

The stud puller 40, as seen in FIG. 5, has an upper portion 42 and a lower portion 50. The upper portion 42 has a diameter greater than the diameter of the bore 26 of the collar 20. The upper portion 42 is suitable for being driven by any conventional means such as a hex wrench or socket wrench. The upper portion 42 has an abutment surface 43 which is adapted for engagement with the bearing surface 24 of the collar 20 or a washer 30 as discussed hereinafter. The lower portion 50 is constructed to be received within the bore 26 of the collar 20. The abutment surface 43 contacts the bearing surface 24. A threaded bore 45 is provided along the entire length of the stud puller 40. The threads 47 correspond to the threads 6 of the stud 4 to be installed.

Figure 3:
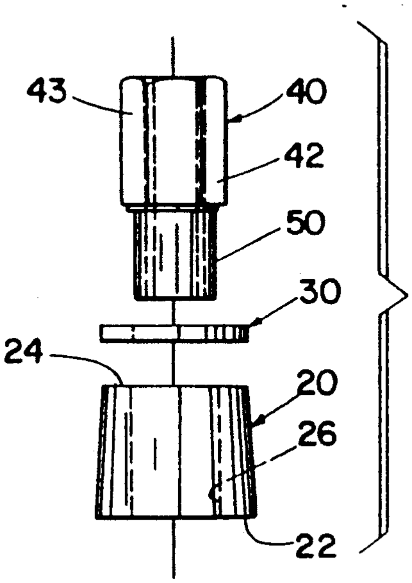
FIG. 3 is an exploded front view of the stud installer of the present invention.
Figure 4:
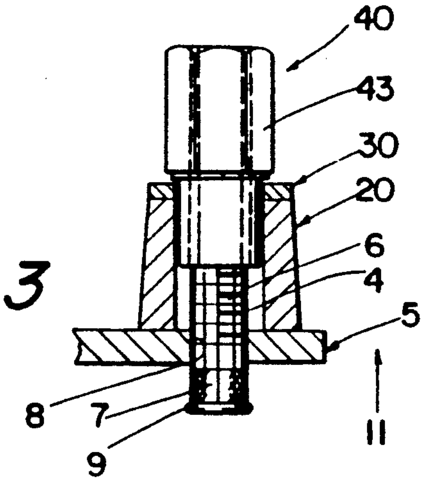
FIG. 4 is a front partial cut away view of the stud installer of the present invention shown in conjunction with a stud and spindle.

Alternatively, a washer 30, as seen in FIGS. 3 and 4, may be provided between the bearing surface 24 and the abutment surface 43 to allow for rotation of the stud puller 40 with a minimum of friction thereby reducing the torque input required to install the stud 4 and minimizing wear on the collar 20.

In operation, the stud 4 is placed by hand through the hole 8 in the spindle 5 in the direction of the arrow 11 in FIG. 4. The stud 4 has a threaded portion 6 and a knurled end 7. The knurled end 7 is of a diameter substantially equal to the hole 8. Therefore, knurled end 7 cannot be installed into the hole 8 without the aid of the mechanical advantage of the stud installer 10. When the stud 4 is inserted by hand until the knurled end 7 impedes its progress, the collar 20 is placed over the stud 4 and the stud puller 40 is threaded by hand onto the stud 4 as seen in FIG. 4. If desired, a washer 30 can be placed between the stud puller 40 and the collar 20 to reduce friction between the two. Next, a wrench (not shown) or other input device is used to apply torque to the means for receiving rotational input 43 associated with the upper portion 42 of the stud puller 40 thereby pulling the knurled end 7 into the hole 8. The stud 4 is pulled into the hole 8 until the shoulder 9 abuts against the spindle 5. When the stud 4 is installed using the stud installer 10 of the present invention, torque may be transferred to the washer 30 or collar 20; however, substantially no torque will be transmitted from the collar 20 to the spindle 5. Accordingly, the spindle 5 will not be damaged due to the installation of the stud.

Additionally, forces perpendicular to the stud 4 will be transmitted to the collar and spindle and not to the stud 4. Thus, the stud 4 is protected from damage due to these forces.

While the present invention has been described in conjunction with a preferred embodiment, many modifications and variations will be readily apparent to those of ordinary skill in the art. This disclosure and the following claims are intended to cover all such modifications and variations.

What I claim is:

1. In combination with the spindle of a vehicle wheel, said spindle having at least one hole therein adapted to receive a threaded wheel stud having threads at one extended end section and a knurled portion adjacent a shoulder at the other end, which shoulder of the stud abuts against the inside surface of the spindle and which stud is maintained in the spindle hole in an interference fit between the knurled portion and the hole, an apparatus for installing the wheel stud in the hole comprising:

(A) a collar having a bearing surface at one end and a support surface at the other end positioned on the outside surface of the spindle, the collar including a longitudinal bore therethrough, said bore defining a central axis in alignment with the hole in the spindle and being adapted to receive therein the lower section of a puller;

(B) a puller having a lower section inserted into and removable from the bore of the collar and an upper section which extends transversely beyond the bore of the collar to the area of the bearing surface of the collar, the puller including an interiorly threaded bore having threads corresponding to the threads of the wheel stud such that the threaded end section of the stud can be inserted into and maintained therein;

the upper section of the puller having means for receiving a rotational force input and having an abutment surface at the location thereon which extends beyond the bore of the collar, said abutment surface of the upper section of the puller being capable of engagement with the bearing surface of the collar, said puller being rotatable in the bore of the collar as the abutment surface engages the bearing surface of the collar, and in which combination the threaded bore of the puller, the bore of the collar and the hole in the spindle are in substantially concentric alignment.

2. The combination of claim 1 further including a washer between the abutment surface of the puller and the bearing surface of the collar, through which washer the respective surfaces are in engagement.

3. The combination of claim 1 further including a threaded wheel stud having threads at one end section and a knurled portion at the other end adjacent a shoulder in which:

(A) the stud is inserted into the hole in the spindle such that the threaded end section extends outwardly from the outside surface of the spindle towards the collar and puller; and (B) the threaded end section of the stud is inserted into and maintained in the interiorly threaded bore of the puller.

4. The combination of claim 2 further including a washer between the abutment surface of the puller and the bearing surface of the collar, through which washer the respective surfaces are in engagement.

5. The combination of claim 3 in which the knurled portion of the wheel stud is engaged in an interference fit with the hole in the spindle and in which the shoulder of the stud adjacent the knurled portion abuts against the inside face of the spindle.

6. The combination of claim 5 further including a washer between the abutment surface of the puller and the bearing surface of the collar, through which washer the respective surfaces are in engagement.

7. The combination of claim 1 in which the means for receiving a rotational force input at the upper section of the puller is hexagonal in cross-section.

8. The combination of claim 3 in which the means for receiving a rotational force input of the upper section of the puller is hexagonal in cross-section.

9. The combination of claim 1 in which the collar is a truncated cone and the cross-sectional diameter of the bearing surface is less than the cross-sectional diameter of the support surface.

10. The combination of claim 3 in which the collar is a truncated cone and the cross-sectional diameter of the bearing surface is less than the cross-sectional diameter of the support surface.

* * * * *